July 27, 1971  R. J. PERRONE ET AL  3,595,737
PELLET FOR IMPROVED EXTRUSION METHOD
Original Filed Sept. 11, 1967
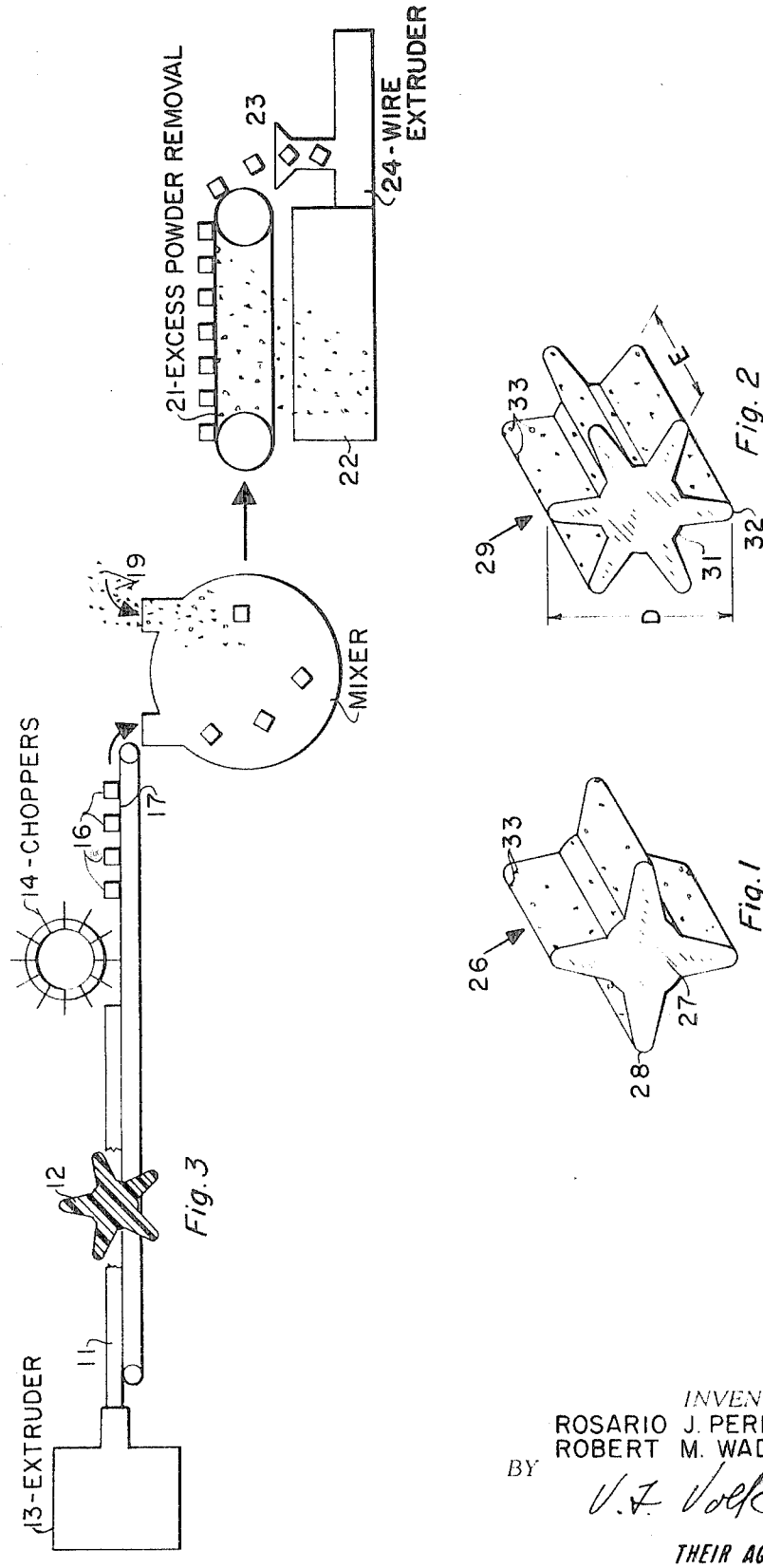
INVENTORS
ROSARIO J. PERRONE
ROBERT M. WADE
BY
V. F. Volk
THEIR AGENT United States Patent Office 3,595,737
Patented July 27, 1971

3,595,737
PELLET FOR IMPROVED EXTRUSION METHOD
Rosario J. Perrone, Marion, and Robert M. Wade, Wabash, Ind., assignors to Anaconda Wire and Cable Company
Original application Sept. 11, 1967, Ser. No. 666,574, now Patent No. 3,509,247, dated Apr. 28, 1970. Divided and this application Oct. 1, 1969, Ser. No. 871,204
Int. Cl. B29b 1/03
U.S. Cl. 161—168     5 Claims

ABSTRACT OF THE DISCLOSURE

Rubber or plastic pellets for use in a mixing extruder are fluted, with the number and depth of the flutes providing the proper surface to volume ratio for dusting or wetting with one of the components of the composition, such as a curing agent or colorant.

CROSS REFERENCE TO RELATED APPLICATION

This application is a division of application Ser. No. 666,574, filed Sept. 11, 1967, now Pat. 3,509,247.

BACKGROUND OF THE INVENTION

Our invention relates to the extrusion of rubber or plastic materials, referred to hereafter by the term "rubber-like." One important case of such extrusion resides in the application of insulation to electric conductors. The rubber-like material is fed into the extruder in the form of pellets and the mixing of these pellets with other components of the desired final composition takes place in the extruder itself. To assure the proper proportions of ingredients, the components such as curing agents, colorants, gassing agents, etc., must be accurately metered into the extruder hopper. This is not easily done, particularly if the extrusion is frequently interrupted and if the quantity of the added component is relatively small. It has been suggested that the added components, particularly pigments, might be added uniformly by coating them on the surface of the pellets. Prior to the present invention this method has been unsatisfactory insofar as it has not permitted accurate metering of the quantity of the component added.

It is known, of course, that the surface to volume ratio of a given volume of material can be increased by reducing the size of the units into which the material is divided. This means cannot, however, be practically utilized to increase the surface area of rubber-like particles to be fed into an extruder since, for reasons of efficient handling and flow through the extruder hopper, there is an optimum particle diameter dimension. This dimension falls within about 1/8 to about 3/8 inch and it is not feasible to use very fine pellets for the purpose of increasing the area to volume ratio.

SUMMARY

We have solved these problems by forming the pellets with a surface to volume ratio selected to have the proper proportion of an added component adhere to its surface. This cannot be done merely by changing the size of the pellets since pellets that are too small or too large will not feed smoothly into an extrusion hopper. The best pellet shape from the point of view of hopper feed, is one such as a sphere cube, or cylinder where the length equals the diameter. Flakes and long rods are not desirable. We extrude a continuous strand of the rubber-like material with a fluted cross-section, by which we mean that the cross-section comprises a hub with a least three flutes extending radially therefrom, and then chop the strand into pellets with a length approximately equal to their diameter. We mix these pellets with a supply of the component to be added so as to coat the surfaces with the component, then remove the excess of component and feed the pellets into an extruder hopper. In the extruder the component is thoroughly blended into the rubber-like material in a known manner. Extruders of several types are well known that are particularly designed to accomplish a thorough mastication and blending of the stock material.

BRIEF DESCRIPTION OF THE DRAWING

FIG. 1 show a pellet with four flutes made in accordance with our invention.

FIG. 2 shows a pellet with six flutes made in accordance with our invention.

FIG. 3 represents schematically a method of our invention.

DESCRIPTION OF THE PREFERRED EMBODIMENT

We refer first to FIG. 3 since the utility of our invention can best be understood from a description of the process. A rubber-like extrudate 11 shown in enlarged section at 12 is extruded from a rubber or plastic extruder 13 of known type in a continuous length and is passed under a chopping wheel 14 which cuts it into pellets 16 having a length approximately equal to their sectional span (indicated as D in FIG. 2). The pellets are carried forward by a conveyor 17 whence they are introduced into a rotating drum mixer 18 along with a supply 19 of the powdered constituent. In order that excess powder may be removed from the pellets 16 they are conveyed to an extruder 24 on perforated belt 21 through which the excess powder can be collected in a bin 22. Where the quantity of the component 19 added to the mixer 18 does not provide any excess powder the step of removing the excess can be omitted. To enter the extruder 24 the pellets 16, covered with the component 19, are fed into a hopper 23. Within the extruder 24 there is a worm of which a number of satisfactory types are known, and which is not shown in the drawing, acting within a known type of cylinder, also not shown, wherein the component 19 is thoroughly dispersed in the softened rubber-like composition formed from the pellets 16.

Although we have shown the component 19 added in the form of a powder it will be understood the component may be a liquid. This liquid may itself be the active component or a solid component may be dissolved in a suitable liquid carrier such as a plasticizer or lubricant for the rubber-like material.

With reference to FIGS. 1 and 2 it can be seen that our invention provides a means for changing the surface to volume ratio while still maintaining the optimum length to diameter ratio required for flowing pellets into a hopper. In FIG. 1 a pellet, indicated by the numeral 26, is comprised, in section, of a hub 27 and four flutes 28 extending radially from the hub. In FIG. 2 another pellet 29, the same volume as the pellet 26, has a hub 31 and six radially extending flutes 32. It is clear from the drawing that the pellet 29 has a greater surface for picking up powder than the pellet 26. In each case we have preferred to make the length E of the pellet about equal to the diameter D and to make the flutes of equal radial extension. As shown in the drawing the pellets 26, 29 have been dusted with a powder 33 of a chemical component but our invention is also effective when the component is a liquid, preferably oily and non-volatile.

As an example of the utility of our invention we cite the case of the addition of dicumyl peroxide powder as a curing agent for ethylene propylene rubber terpolymer. When it was attempted to add about 1.5% of this peroxide to the surface of the terpolymer in the form of spheres of about 1/4 inch diameter the spheres did not pick up all the powder but when the terpolymer was extruded in a form having a hub and five flutes all the peroxide was taken up without difficulty and the pellets fed into an extruder.

In another example, fluted pellets of chlorosulfonated polyethylene readily picked up on their surface a powdered curing agent consisting of dipentamethylenethiuramtetrasulfide, benzothiazyl disulfide, and a curing promoter (DuPont's LD 339) in equal parts.

We have invented a new and useful article and method of which the foregoing description has been exemplary rather than definitive and on which we desire an award of letters patent as defined in the following claims.

We claim:

1. An extruded pellet of rubber-like material for feeding into an extruder comprising:
   (A) a hub,
   (B) at least three flutes extending radially from said hub,
   (C) the diameter of said pellet being between about ⅛ and about ⅜ inch, and the surface to volume ratio being selected to support a proper proportion of an added component adhered thereto, and
   (D) a surface coating of said added component for said material adhering to said pellet.

2. The pellet of claim 1 wherein said pellet is approximately equal in length and diameter.

3. The pellet of claim 1 wherein said flutes have approximately equal radial extensions.

4. The pellet of claim 1 wherein said component comprises a curing agent for said material.

5. The pellet of claim 1 wherein said component comprises a colorant for said material.

References Cited

UNITED STATES PATENTS

| 2,743,511 | 5/1956 | Genovese | 161—177 |
| 2,862,243 | 12/1958 | Farr et al. | 264—178 |

ROBERT F. BURNETT, Primary Examiner

L. M. CARLIN, Assistant Examiner

U.S. Cl. X.R.

117—100; 161—177